(12) United States Patent
Celebi

(10) Patent No.: US 6,885,712 B1
(45) Date of Patent: Apr. 26, 2005

(54) METHODS AND DEVICES FOR MINIMIZING INTERBLOCK INTERFERENCE USING AN OPTIMUM TIME OF REFERENCE

(75) Inventor: Samel Celebi, Little Falls, NJ (US)

(73) Assignee: Agere Systems Inc., Allentown, PA (US)

(*) Notice: Subject to any disclaimer, the term of this patent is extended or adjusted under 35 U.S.C. 154(b) by 919 days.

(21) Appl. No.: 09/639,642

(22) Filed: Aug. 16, 2000

(51) Int. Cl.[7] .................. H04L 25/08; H04L 27/28; H04J 11/00
(52) U.S. Cl. ................ 375/346; 375/260; 370/210
(58) Field of Search .................. 375/346, 260, 375/229, 232, 272; 370/210

(56) References Cited

U.S. PATENT DOCUMENTS

| | | | | |
|---|---|---|---|---|
| 4,617,535 A | * | 10/1986 | Unerdem | 332/104 |
| 4,807,173 A | * | 2/1989 | Sommen et al. | 708/321 |
| 5,317,596 A | * | 5/1994 | Ho et al. | 375/232 |
| 6,466,666 B1 | * | 10/2002 | Eriksson | 379/406.01 |
| 6,693,957 B1 | * | 2/2004 | Wingrove et al. | 375/222 |

OTHER PUBLICATIONS

Falcaner, D.D., Magee, F.R., Jr. Bell Systems Technical Journal V. 52, No. 9, pp. 1541–1562 11/73.
N. Al–Dhahir and J.M. Cioffi IEEE Trans. on Comm. V. 44, pp. 56–64, 1996.
N. Al–Dhahir and J.M. Cioffi IEEE Trans. on Comm. V. 45, pp. 948–956 1997.
P.J.W. Melsa, R.C. Younce and C.E. Rohrs IEEE Trans. On Comm. V. 44, pp. 1662–1672, 1996.
C. Yin and G. Yue Electronics Letters, V. 34, pp. 35–36, 1998.
E. Oja Mathematical Biology, pp. 267–273, 1982.
E. Oja and J. Karhunen J. of Mathematical Analysis and App., pp. 69–84, 1985.
S. Haykin, Neural Networks Comprehensive Foundation Macmillan 1994.

* cited by examiner

*Primary Examiner*—Amanda T. Le
*Assistant Examiner*—Cicely Ware

(57) ABSTRACT

A method for reducing interblock interference (IBI) in an impulse response signal transmitted by a communications channel such as a digital subscriber loop (DSL) channel. The method includes computing a time of reference (TOR) based on a windowing function that assumes that the main lobe segment of the impulse response signal does not contribute IBI power and that the tail segments of the impulse signal, which fall outside of the main lobe segment of the impulse signal, contribute a non-uniform amount of IBI power. The method reduces IBI in the impulse response signal beyond that of conventional IBI reducing methods.

7 Claims, 3 Drawing Sheets

METHODS AND DEVICES FOR MINIMIZING INTERBLOCK INTERFERENCE USING AN OPTIMUM TIME OF REFERENCE

BACKGROUND OF THE INVENTION

A "digital subscriber loop"("DSL") is a type of communications connection and/or service which is now being offered by many local exchange carriers (e.g., telephone companies) to consumers and businesses alike as a way of receiving faster Internet connections and downloads.

When a signal $\delta(n)$, where "n" represents an increment of time, is fed into one end of a DSL channel, a scaled (i.e., amplified or attenuated) version of $\delta(n)$ and scaled versions of delayed replicas (i.e., echo) of $\delta(n)$ are received at the opposite end of the channel. This characteristic is known as the "memory effect" of the channel. The signal received at the opposite end of the channel is known as the impulse response h(n). Individual components of h(n) determine how much each delayed replica of $\delta(n)$ is amplified or attenuated.

Discrete multi-tone ("DMT") transceivers are devices which are designed to send and receive DSL-compatible signals (hereafter "DSL signals") over DSL channels. The quality of a DSL signal received by a DMT transceiver depends on a number of factors. One such factor is the amount of interblock interference ("IBI"). IBI is caused by the aforementioned memory effect. In particular, IBI results from portions of past information "blocks" leaking into current information blocks of a signal $\delta(n)$. DMT transceivers are designed to generate and insert a guard time sequence "M", called a "cyclic prefix", between each transmitted information block in an attempt to reduce the undesirable effects of IBI. The hope is that the information from previous blocks will die out during this time sequence before it leaks into a current block. In order to completely eliminate IBI, the cyclic prefix M must be at least as long as the length "L" of the impulse response. However, this can rarely be achieved in practice because such a long cyclic prefix M would significantly decrease the throughput of a channel. Thus, it is necessary to use supplemental methods and devices to reduce IBI.

FIG. 1 depicts a graph of a typical, simplified impulse response h(n), of a DSL channel. The impulse response h(n) and its associated length "L" may be expressed as:

$$h(n) = \sum_{-L_2}^{L_1} h_k \delta(n-k); L = L_1 + L_2 + 1 \quad (1)$$

Impulse response h(n) comprises a causal portion "$L_1$" and a non-causal portion "$L_2$". The causal portion $L_1$ consists of the real-time portion of the impulse response h(n). The non-causal portion $L_2$ consists of the delayed, or stored, portion of the impulse response h(n). The impulse response h(n) can be arbitrarily partitioned into three segments, namely: an "upper tail" $h_a(n)$; a "lower tail" $h_b(n)$; and a "main lobe" $h_c(n)$. The segments are defined as follows:

$h_a(n)=h(n+M+1)$ for n 0; $h_a(n)=0$ otherwise $h_b(n)=h(-n-b\ 1)$ for n 0; $h_b(n)=0$ otherwise $h_c(n)=h(n)$ for 0 n M; $h_c(n)=0$ otherwise The main lobe $h_c(n)$ comprises the segment of the impulse response h(n) which falls within the time range of the cyclic prefix M. The location of h(0) is the starting location of the main lobe $h_c(n)$. This location is called the time of reference ("TOR"). The tails $h_a(n)$ and $h_b(n)$ fall outside of the time range of the cyclic prefix M. Since the tails $h_a(n)$ and $h_b(n)$ are the only segments of the impulse response h(n) which fall outside of the range of the cyclic prefix M, they are the only segments that contribute to IBI.

A known method for reducing IBI involves computing the TOR that maximizes the main lobe energy "$E_c$", which is the energy under main lobe $h_c(n)$. The main lobe energy $E_c$ is given by the following equation:

$$E_c = \sum_{n=0}^{M} h(n)^2 \quad (2)$$

According to this method, maximizing the main lobe energy $E_c$ is achieved using a window correlation technique which correlates $h^2(n)$ with a rectangular windowing function $w_1(n)$ of size "M+1" to generate a cross-correlation function and which computes a TOR. Using this technique, the location of the TOR corresponds to the maximum output value of the cross-correlation function. The windowing function $w_1(n)$ is shown in FIG. 2.

Computing the time of reference based on maximizing the main lobe energy $E_c$ is similar to computing the time of reference such that the energy under the tails $h_a(n)$ and $h_b(n)$ is minimized. This approach is intuitive. Because the tails $h_a(n)$ and $h_b(n)$ alone contribute to IBI, it seems to follow that the impulse response h(n) should be partitioned such that the tails have as little energy as possible. However, this approach erroneously assumes that individual points along the tails $h_a(n)$ and $h_b(n)$ contribute a uniform amount of IBI power. Therefore, although this approach reduces IBI, it does not provide the optimum TOR such that IBI is minimized.

The present inventor has discovered that, contrary to previous belief, that each point along the tails $h_a(n)$ and $h_b(n)$ contributes a non-uniform amount of IBI power. More specifically, the present inventor discovered that IBI power increases linearly from point to point, as the distance from the point to the main lobe $h_c(n)$ increases. Accordingly, it is desirable to provide methods and devices for computing the optimum time of reference so that IBI is minimized.

Other desires will become apparent to those skilled in the art from the following description taken in conjunction with the accompanying drawings and claims.

SUMMARY OF THE INVENTION

In accordance with the present invention, methods and devices are provided for minimizing interblock interference ("IBI") in a DSL signal. IBI is minimized by computing an optimum time of reference ("TOR") for the impulse response of a communications channel. One device envisioned by the present invention comprises a transceiver module that is adapted to compute an optimum TOR by: generating a novel windowing function; generating a novel time of reference-optimizing function through minimizing a cross-correlation between the windowing function and the square of the impulse response; computing an output value of the time of reference-optimizing function; and identifying the optimum TOR as the location of the output value. The computation of the optimum TOR minimizes IBI in a DSL signal prior to supplemental filtering of the signal. Furthermore, since the present invention reduces IBI in an impulse response, the performance of supplemental filters which are used to further suppress IBI is improved.

The windowing function and time of reference-optimizing function envisioned by the present invention are based on the realization that the contribution of terms within the tails of an impulse response to IBI power increases linearly with the distance of the terms from the main lobe of the impulse response. This discovery is contrary to the assumption of prior methods and devices that each term within the tails of an impulse response contributes equally to IBI power.

The present invention and its advantages can best be understood with reference to the drawings, detailed description of the invention and claims that follow.

DETAILED DESCRIPTION OF THE INVENTION

The present invention provides methods and systems for computing an optimum time of reference ("TOR") for a DMT transceiver. Methods and systems envisioned by the present invention minimize the amount of IBI prior to supplemental filtering.

Figure 1:
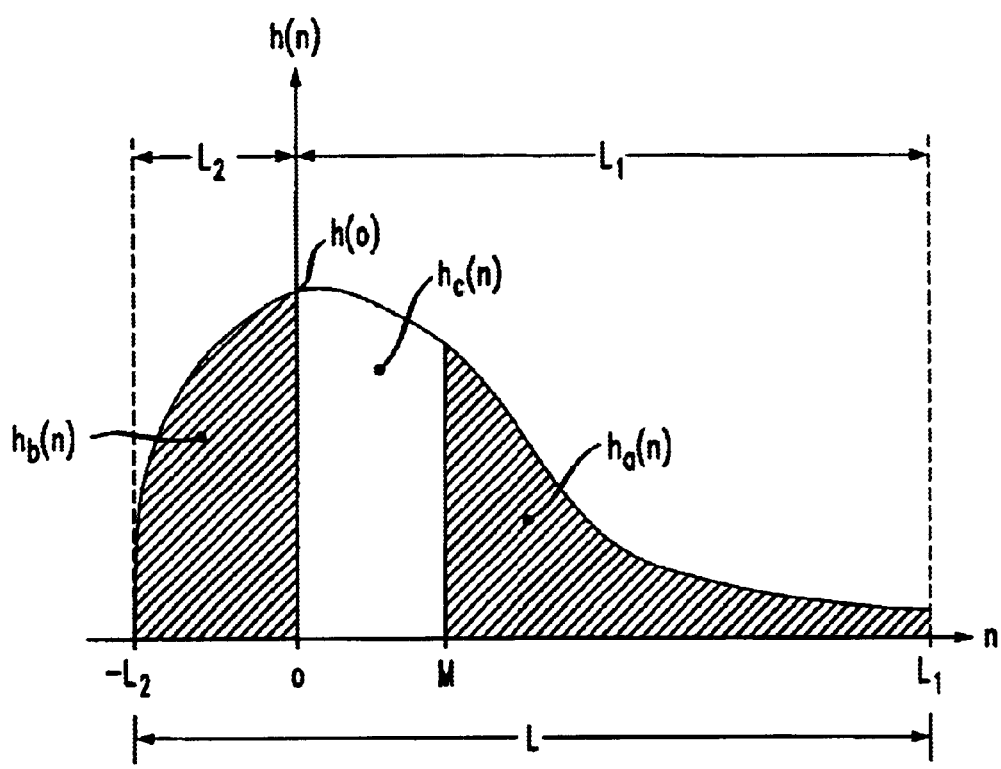
FIG. 1 depicts an example of an impulse response.

FIG. 1 depicts a typical impulse response h(n) of a DSL channel. The impulse response h(n), and its associated length can be given by:

$$h(n) = \sum_{-L_2}^{L_1} h_k \delta(n-k); L = L_1 + L_2 + 1 \quad (1)$$

where δ(n) is an input impulse signal, "n" is a unit of time, $L_1$ and $L_2$ are the lengths of causal and noncausal portions of h(n), h(0) is the location of the TOR, and "M" is the cyclic prefix. The upper tail, lower tail and main lobe of h(n) are identified by $h_a(n)$, $h_b(n)$ and $h_c(n)$, respectively.

The present invention concerns minimizing IBI in a signal δ(n) that is created by the tails $h_a(n)$ and $h_b(n)$ of the impulse response h(n). In order to minimize IBI in the signal δ(n), the total IBI power within the tails $h_a(n)$ and $h_b(n)$ must be minimized. Total IBI power, $P_{IBI}$, can be expressed using the following equation:

$$P_{IBI} = \sum_n (n+1)[h_a^2(n) + h_b^2(n)] \quad (3)$$

From equation (3), it can be shown that points along the tails $h_a(n)$ and $h_b(n)$ contribute non-uniform amounts of IBI power, in a linearly-increasing manner, as the distance of the points from the main lobe $h_c(n)$ of the impulse response h(n) increases (hereafter referred to as contributing "non-uniform amounts of IBI"). That is, the contribution of h(M+5), which is the fifth term of upper tail $h_a(n)$, to IBI power $P_{IBI}$ is five times that of h(M+1), which is the first term of upper tail $h_a(n)$. This principle, which is contrary to previous belief, is disclosed in co-pending U.S. patent applications Ser. Nos. 09/639,640 and 09/639,641. It is also clear from the equation (3) that the main lobe $h_c(n)$ does not contribute to IBI power, as expected.

According to an illustrative embodiment of the present invention, a novel transceiver comprising a novel "windowing function" and a novel time of reference-optimizing function is adapted to minimize IBI by computing the optimum time of reference TOR for the impulse response h(n). The optimum TOR is computed based on minimizing the total IBI power. More specifically, the optimum TOR is computed by: generating a novel windowing function; generating a time of reference-optimizing function by minimizing a cross-correlation between the windowing function and the square of the impulse response h(n) (i.e., minimizing total IBI power); computing the output value of the time of reference-optimizing function; and identifying the optimum TOR as the location of the output value. The windowing and time of reference-minimizing functions are generated by taking into account the fact that that points along the tails $h_a(n)$ and $h_b(n)$ of impulse response h(n) contribute non-uniform amounts of IBI.

Figure 2:
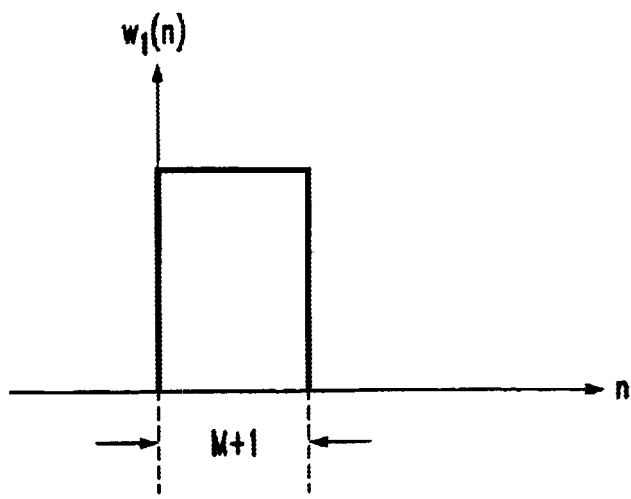
FIG. 2 depicts a windowing function used in known cross-correlation techniques for computing a time of reference.
Figure 3:
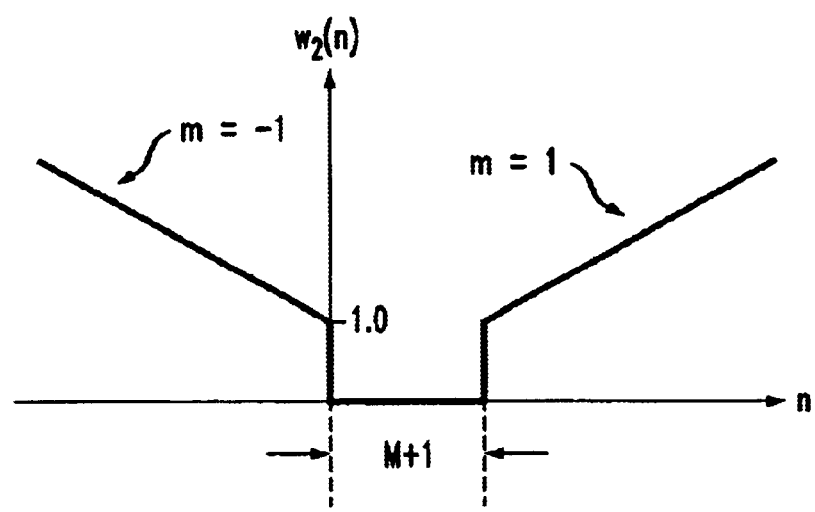
FIG. 3 depicts a windowing function envisioned by one embodiment of the present invention.

Computing the optimum TOR requires generating an illustrative windowing function $w_2(n)$ shown in FIG. 3. Windowing function $w_2(n)$ reflects the fact that points along tails $h_a(n)$ and $h_b(n)$ of the impulse response h(n) contribute non-uniform amounts of IBI power. The windowing function $w_2(n)$ replaces the windowing function $w_1(n)$ (shown in FIG. 2), which is erroneously used in existing methods to compute the TOR. As shown in FIG. 3, the windowing function $w_2(n)$ comprises a mid-section of zero value. This section corresponds to the main lobe $h_c(n)$, and reflects the fact that the main lobe $h_c(n)$ does not contribute to IBI power. The sections to the right and left of the mid-section correspond to the upper and lower tails $h_a(n)$ and $h_b(n)$, respectively. The slope "m" of the left and right sections reflects the fact that points along the tails $h_a(n)$ and $h_b(n)$ contribute non-uniform amounts of IBI.

In an illustrative embodiment of the present invention, once the windowing function $w_2(n)$ has been generated, a time of reference-optimizing function $F_{TOR\ optimum}$ is generated. The time of reference-optimizing function is given by:

$$F_{TORoptimum} = \arg\min_m \sum_n h^2(n) w_2(n-m) \quad (4)$$

The time of reference-optimizing function $F_{TOR\ optimum}$ is generated by minimizing a cross-correlation of the windowing function $w_2(n)$ and $h^2(n)$ (i.e., the square of the impulse response h(n)). The time of reference-optimizing function $F_{TOR\ optimum}$ is in essence a minimization function for the total IBI power, $P_{IBI}$.

In an illustrative embodiment of the invention, after an output value of the time of reference-optimizing function $F_{TOR\ optimum}$ is generated, the optimum TOR is identified as the location of the output value. By identifying the optimum TOR for a minimized total IBI power $P_{IBI}$, it follows that the amount of IBI generated by the impulse response h(n) is minimized.

Figure 4:
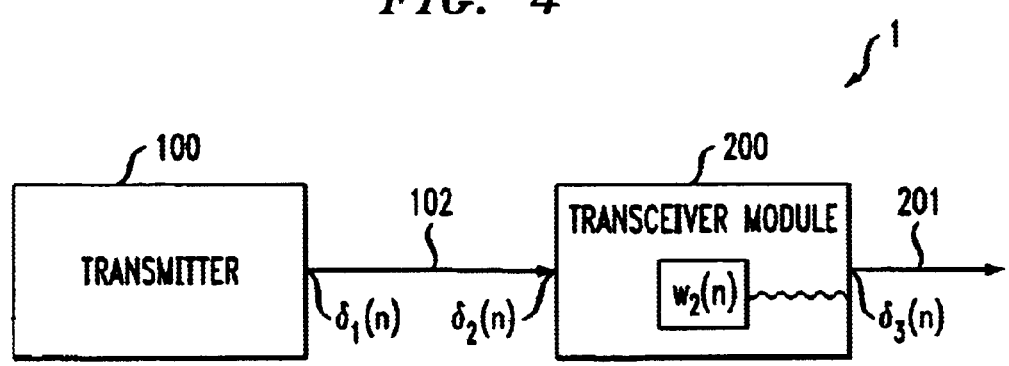
FIG. 4 depicts a DSL sub-system comprising a novel transceiver module adapted to minimize IBI according to one embodiment of the present invention.

FIG. 4 shows an example of a DSL sub-system 1. Sub-system 1 comprises a transmitter 100 and a novel device 200, such as a transceiver module, adapted to minimize IBI. The transceiver module 200 envisioned by the present invention may comprise the features and functions disclosed in either of co-pending U.S. patent applications Ser. Nos. 09/639,640 and 09/639,641. Transceiver module 200 is adapted to generate the novel windowing function $w_2(n)$ previously described and shown in FIG. 3. An example of how transceiver 200 operates is as follows.

Transmitter 100 generates and transmits a DSL signal $\delta_1(n)$, such as a DSL signal, through a communication channel 102, whose impulse response h(n) associated with DSL signal $\delta_1(n)$ is known and graphically represented in FIG. 1. Upon exiting channel 102, signal $\delta_2(n)$ is received by transceiver module 200 using means known in the art. Signal $\delta_2(n)$ comprises IBI created by the tails $h_a(n)$ and $h_b(n)$ of the impulse response h(n).

Thereafter, transceiver module 200 is adapted to minimize IBI. More specifically, transceiver 200 is adapted to compute the optimum time of reference for the impulse response h(n) based on minimizing total IBI power $P_{IBI}$. Computing the optimum TOR comprises: generating the windowing function $w_2(n)$; generating a time of reference-optimizing function $F_{TOR\ optimum}$ through minimizing a cross-correlation between the windowing function $w_2(n)$ and the square of the impulse response h(n); computing an output value of the time of reference-optimizing function $F_{TOR\ optimum}$; and identifying the optimum TOR as the location of the output value.

Once the optimum TOR of impulse response h(n) has been computed, transceiver module 200 is adapted to transmit a signal $\delta_3(n)$ comprising a minimum amount of IBI, without supplemental filtering, to other devices in the subsystem 1 via channel 201. According to one embodiment of the invention, the signal $\delta_3(n)$ may be transmitted to a supplemental filter (not shown) which is adapted to execute an algorithm to further suppress IBI. The supplemental filter may comprise a time domain equalizer ("TEQ"), such as the TEQ disclosed in either of co-pending U.S. patent applications Ser. Nos. 09/639,640 and 09/639,641. In such an embodiment, the performance of the supplemental filter/TEQ is improved because the amount of IBI that must be suppressed by the filter is reduced.

The transceiver module 200 may comprise one or more integrated circuits, discrete devices or some combination of the two. According to alternative embodiments of the present invention, transceiver module 200 may comprise a discrete multitone device such as a DMT transceiver, a component within a DMT transceiver, or a part of a TEQ.

It should be understood that module 200 is adapted to carry out all of the steps for minimizing IBI described in more detail above.

Figure 5:
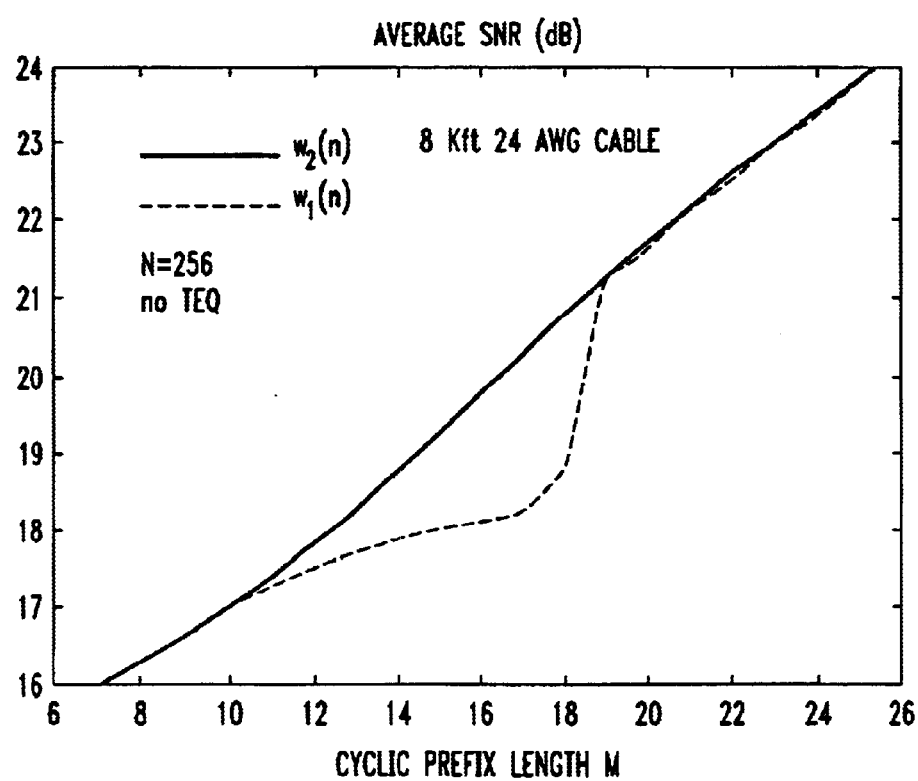
FIG. 5 depicts a comparison of average signal-to-noise ratios of an existing DMT transceiver versus a DMT transceiver comprising one embodiment of the present invention.

FIG. 5 depicts a comparison of the average signal-to-noise ratios ("SNR") of two DMT receivers. The SNRs represented by the dotted line were generated by a DMT transceiver adapted to compute a TOR by maximizing the energy of the main lobe of an impulse response using a conventional windowing function $w_1(n)$ while the SNRs represented by the continuous line were generated by a DMT transceiver according to one embodiment of the present invention adapted to compute an optimum TOR by minimizing total IBI power using the windowing function $w_2(n)$.

The SNRs were calculated using a communication channel which comprised an 8Kft, 24 AWG twisted pair copper wire. The cyclic prefix length was set at M=16 with a sampling frequency of 1.104 and a block length of N=256. As illustrated in FIG. 5, transceiver modules and/or DMT transceivers envisioned by the present invention provide increased SNRs. These SNRs indicate a reduced amount of IBI.

It is to be understood that changes and variations may be made without departing from the spirit and scope of the invention as defined by the claims that follow.

We claim:

1. A method for reducing interblock interference (IBI) in a signal transmitted in a communications channel by determining an optimum time of reference (TOR) for an impulse response of the communications channel, wherein the method comprises the steps of:

generating a windowing function based on points along tails of the impulse response contributing non-uniform amounts of interblock interference;

generating a time of reference (TOR) function based on the windowing function;

determining an output value for the TOR function; and identifying the optimum TOR as the location of the output value.

2. The method as recited in claim 1, wherein the impulse response includes a main lobe and at least one tail, and wherein the windowing function generating step further comprises generating a windowing function based on the contribution of terms within the at least one tail of the impulse response increasing linearly with the distance of the terms from the main lobe of the impulse response.

3. The method as recited in claim 1, wherein the impulse response includes a main lobe and at least one tail, and wherein the windowing function generating step further comprises generating a windowing function based on the main lobe not contributing the interblock interference.

4. The method as recited in claim 1, wherein the TOR function generating step further comprises reducing a cross-correlation between the windowing function and the square of the impulse response.

5. The method as recited in claim 1, further comprising, after the identifying step, the step of supplementally filtering, at least once, the signal transmitted by the communications channel.

6. The method as recited in claim 1, wherein the method is performed within a transceiver module, wherein the transceiver module includes the communications channel and transmits the signal on the communications channel.

7. The method as recited in claim 1, wherein the method is performed within a discrete multi-tone (DMT) transceiver module, wherein the DMT transceiver module includes the communications channel and transmits the signal on the communications channel.

\* \* \* \* \*